(12) United States Patent
Miyashita

(10) Patent No.: US 12,050,816 B2
(45) Date of Patent: Jul. 30, 2024

(54) PRINTER

(71) Applicant: BROTHER KOGYO KABUSHIKI KAISHA, Nagoya (JP)

(72) Inventor: Tomoki Miyashita, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/348,290

(22) Filed: Jul. 6, 2023

(65) Prior Publication Data

US 2024/0012586 A1 Jan. 11, 2024

(30) Foreign Application Priority Data

Jul. 7, 2022 (JP) ................................. 2022-110049

(51) Int. Cl.
*G06F 3/12* (2006.01)
(52) U.S. Cl.
CPC .......... *G06F 3/1206* (2013.01); *G06F 3/1204* (2013.01); *G06F 3/1243* (2013.01)
(58) Field of Classification Search
None
See application file for complete search history.

(56) References Cited

U.S. PATENT DOCUMENTS

| 8,352,851 | B1* | 1/2013 | Brinkman | G06F 40/174 |
| | | | | 715/234 |
| 2003/0023952 | A1* | 1/2003 | Harmon, Jr. | G06F 9/45512 |
| | | | | 717/110 |
| 2018/0012112 | A1* | 1/2018 | Suzuki | G06V 30/268 |
| 2019/0073350 | A1* | 3/2019 | Shiotani | G06F 40/186 |
| 2019/0129992 | A1* | 5/2019 | Ewen | G06F 16/2365 |

FOREIGN PATENT DOCUMENTS

| JP | 2002-41908 A | 2/2002 |
| JP | 2002-163091 A | 6/2002 |
| JP | 2011-118781 A | 6/2011 |
| JP | 2013-200698 A | 10/2013 |
| JP | 2020-161990 A | 10/2020 |

* cited by examiner

*Primary Examiner* — Helen Zong
(74) *Attorney, Agent, or Firm* — KENEALY VAIDYA LLP

(57) ABSTRACT

Printer includes at least one memory configured to storage a first template, a second template, and a common script and a controller configured to execute first applying processing includes processing of applying the common script stored in the at least one memory to the first template in the at least one memory, processing of applying the common script to a first individual script when the first template is corresponded to the first individual script, processing of applying the common script to the second template in the at least one memory, and processing of applying the common script to a second individual script when the second template is corresponded to the second individual script.

15 Claims, 15 Drawing Sheets

FIG. 3A

| ITEM | PRICE |
|---|---|
| CHOCOLATE | 100 |
| CANDY | 200 |
| RICE CRACKER | 250 |
| GUM | 150 |

CHOCOLATE — OBa
TAX-EXCLUDED ¥ 100 — OBb, OBd
TAX-INCLUDED ¥ 110 — OBc, OBe

OBJECT IN TEMPLATE

| OBJECT | OBJECT NAME |
|---|---|
| CHOCOLATE | Hinmoku |
| TAX-EXCLUDED ¥ | Title_Betsu |
| TAX-INCLUDED ¥ | Title_Komi |
| 100 | Num_Betsu |
| 110 | Num_komi |

OBa, OBb, OBc, OBd, OBe

//CALCULATE PRICE INCLUDING TAX FROM PRICE EXCLUDING TAX
Zeikomi = Num_Betsu.Value * 1.10
Num_Komi.Value = Zeikomi

FIG. 7

COMMON SCRIPT — CS

```
//IF THE CONTENT OF THE OBJECT WAS "HEISEI", CHANGE IT TO "REIWA".

DummyObj = GetFirstObject()

Do While DummyObj != NULL
    If DummyObj.Value = "HEISEI" Then
        DummObj.Value = "REIWA"
    End If
    DummyObj = GetNextObject()
Loop
```

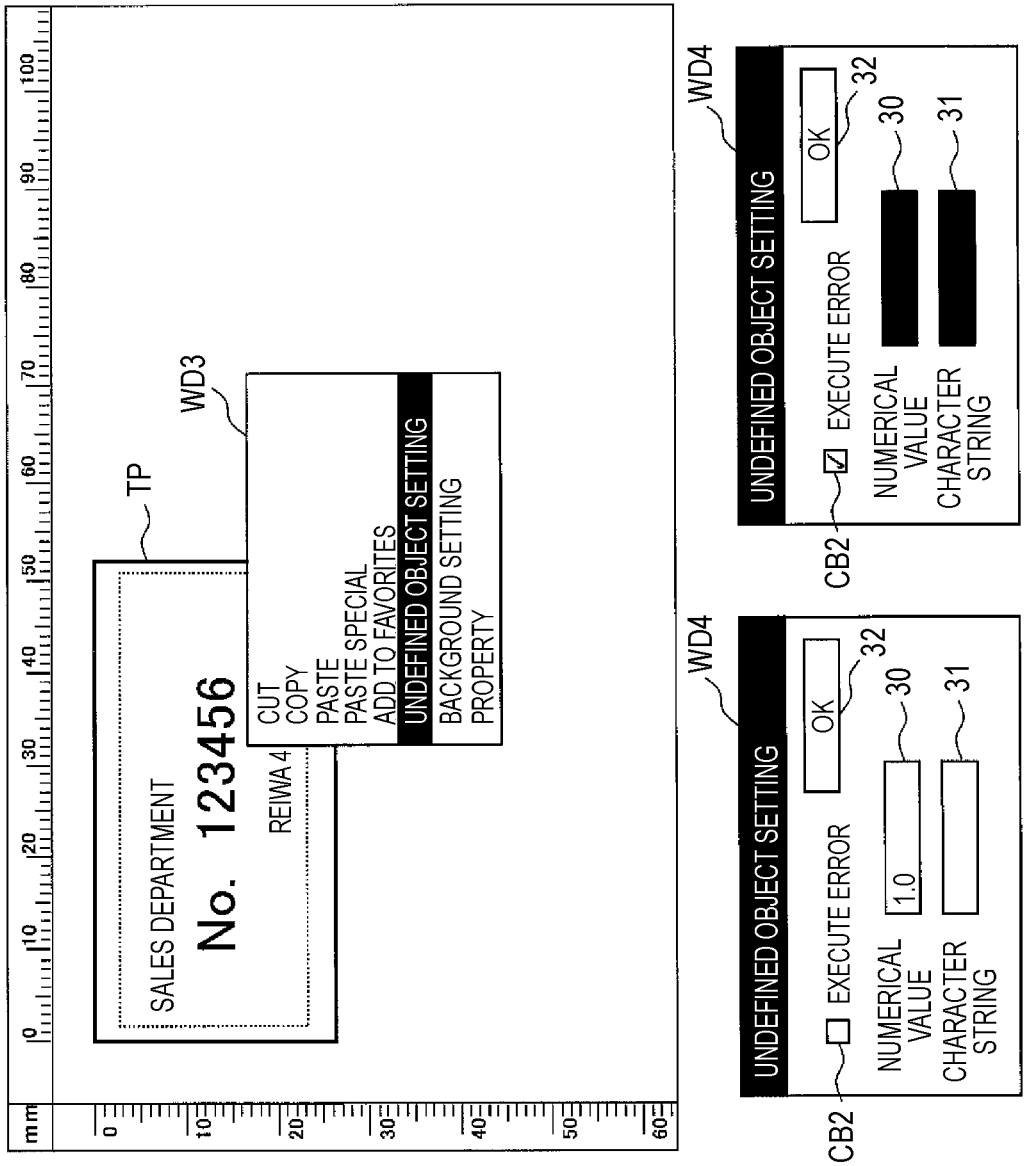

PRINTER

REFERENCE TO RELATED APPLICATIONS

This application claims priority from Japanese Patent Application No. 2022-110049 filed on Jul. 7, 2022. The entire content of the priority application is incorporated herein by reference.

BACKGROUND ART

In the related art, for example, a printer that performs printing using a template selected by a user among a plurality of templates prepared in advance is known.

When a plurality of templates are prepared in advance, the templates are usually configured as separate files. In a case where there is a need to simultaneously change contents of the templates, it is necessary to recreate all the plurality of templates into a new file having new contents, which is inconvenient.

An object of the present disclosure is to provide a printer capable of easily changing contents of a plurality of templates and improving convenience.

DESCRIPTION

In order to achieve the above objects, a printer according to the present disclosure is a printer includes: at least one memory configured to storage a first template, a second template, and a common script; and a controller configured to execute first applying processing, the first applying processing including: processing of applying the common script stored in the at least one memory to the first template in the at least one memory; processing of applying the common script to a first individual script when the first template is corresponded to the first individual script; processing of applying the common script to the second template in the at least one memory; and processing of applying the common script to a second individual script when the second template is corresponded to the second individual script.

In order to achieve the above objects, a printer according to the present disclosure is a printer includes: at least one memory storing a first template, a second template, and a common script; and a controller configured to execute third applying processing, the third applying processing including: processing of applying the common script to the first template; processing of applying the common script to a first individual script when the first template is corresponded to the first individual script; processing of applying the common script to the second template; and processing of applying the common script to a second individual script when the second template is corresponded to the second individual script.

A printer according to the present disclosure includes a printing device, a controller, a first memory, a second memory, and a third memory. The first memory is capable of storing a plurality of templates, and the printer generates a printed matter using the templates. In the printer according to the present disclosure, one common script is used in a case where it is desired to perform content change for the plurality of templates. The third memory is capable of storing the common script. In a case where the common script is stored in the third memory, the common script can be read and applied to a plurality of templates. Alternatively, the printer according to the present disclosure may further use a plurality of individual scripts. The individual scripts are applied to the corresponding templates. In this case, a common script can be applied to the plurality of individual scripts.

In order to use the common script, first applying processing is executed in the controller of the printer. The common script is applied to the applying target template or individual script by the first applying processing. In a case where the applying target is a template, it is possible to simultaneously change the contents of the plurality of target templates by applying the common script. In a case where the applying target is an individual script, it is possible to simultaneously change the contents of the plurality of target individual scripts by applying the common script, and to simultaneously change the contents of the templates to which the respective individual scripts are applied by the change.

According to the present disclosure, it is possible to easily perform content change for a plurality of templates and to improve convenience by using a common script applicable to a plurality of templates or a plurality of individual scripts.

According to the present disclosure, it is possible to easily perform content change for a plurality of templates and to improve convenience.

FIGS. 3A, 3B, and 3C are diagrams showing a specific example of a script in a comparative example in which printing is performed by executing only an individual script without using a common script.

Figure 4:
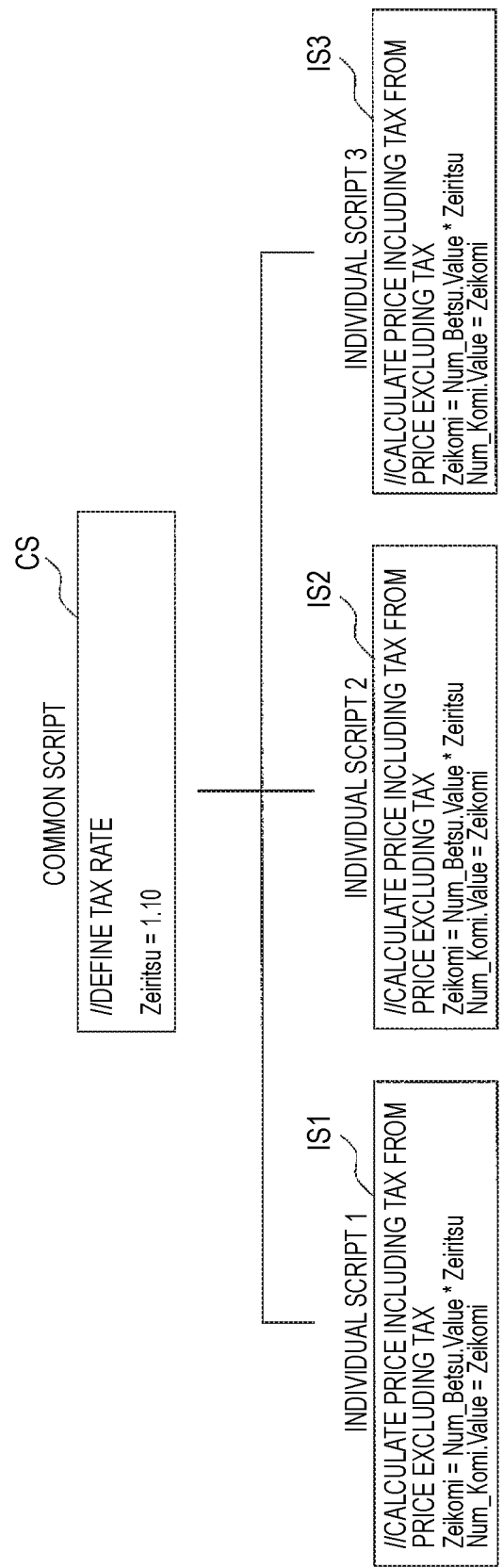

FIG. 4 is a diagram showing an example of a script configuration according to the embodiment.

Figure 5:
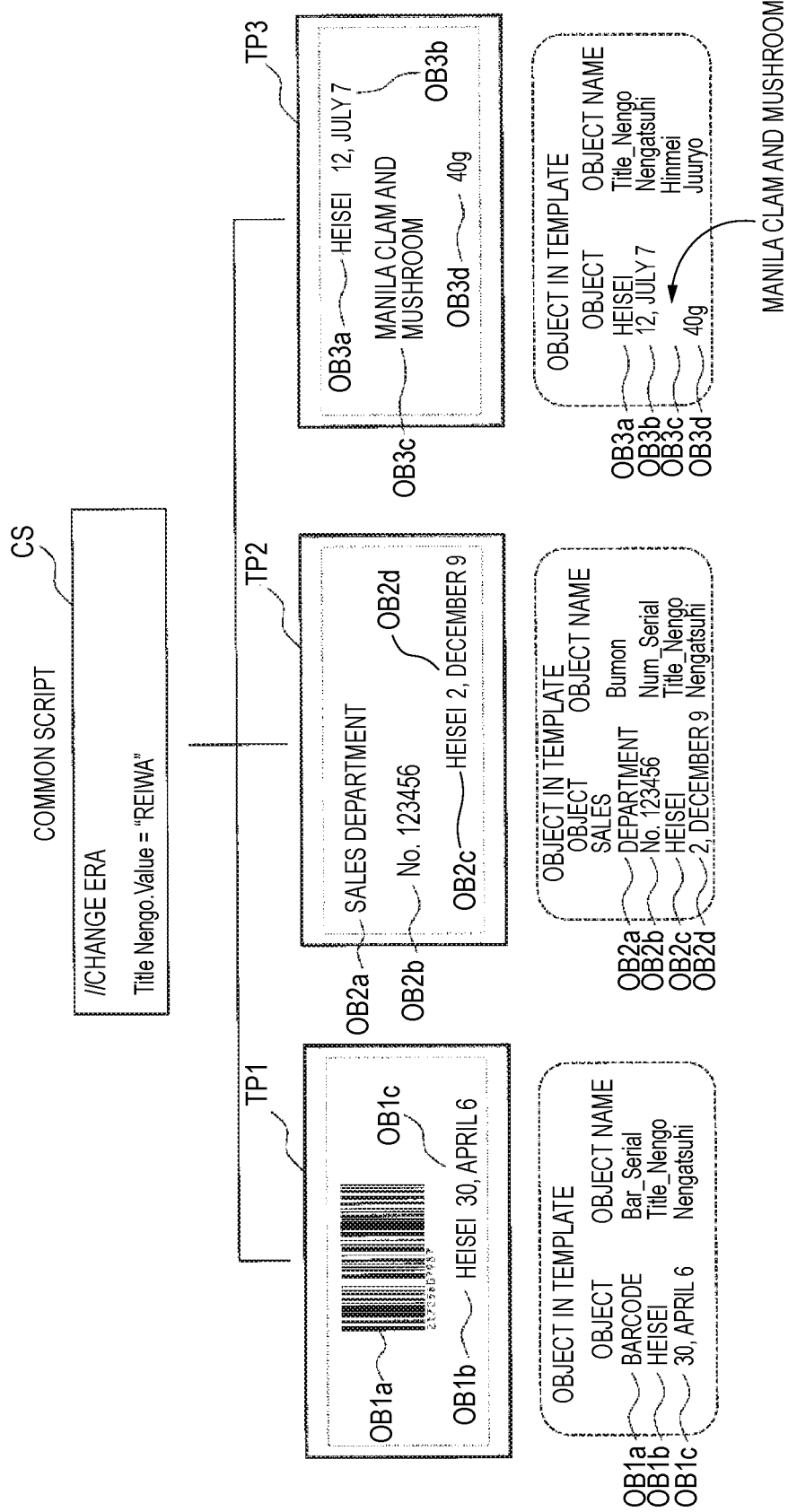

FIG. 5 is a diagram showing another example of the script configuration according to the embodiment.

Figure 6:
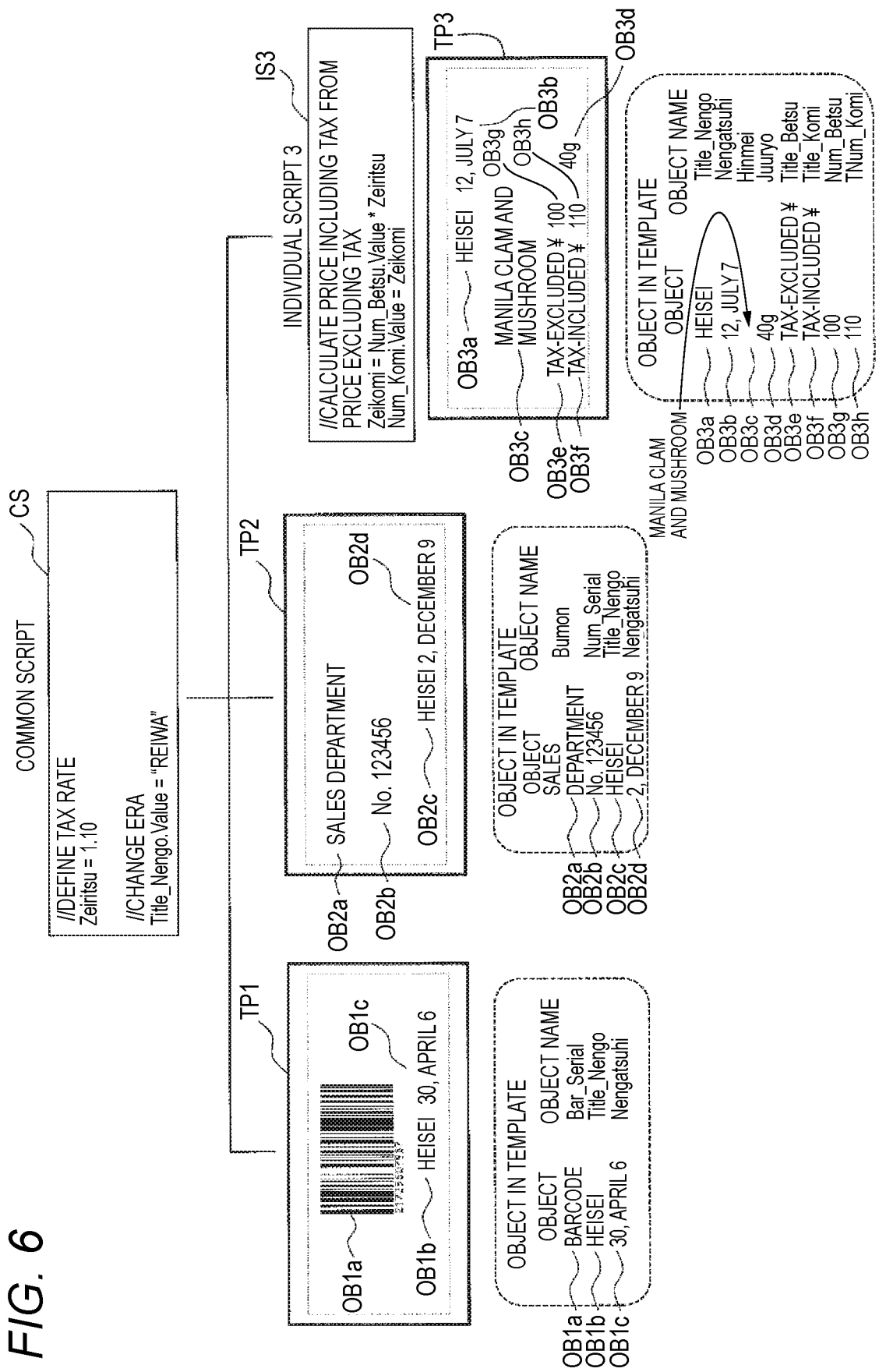

FIG. 6 is a diagram showing still another example of the script configuration according to the embodiment.

FIG. 7 is a diagram showing still another example of contents of the common script.

Figure 8:
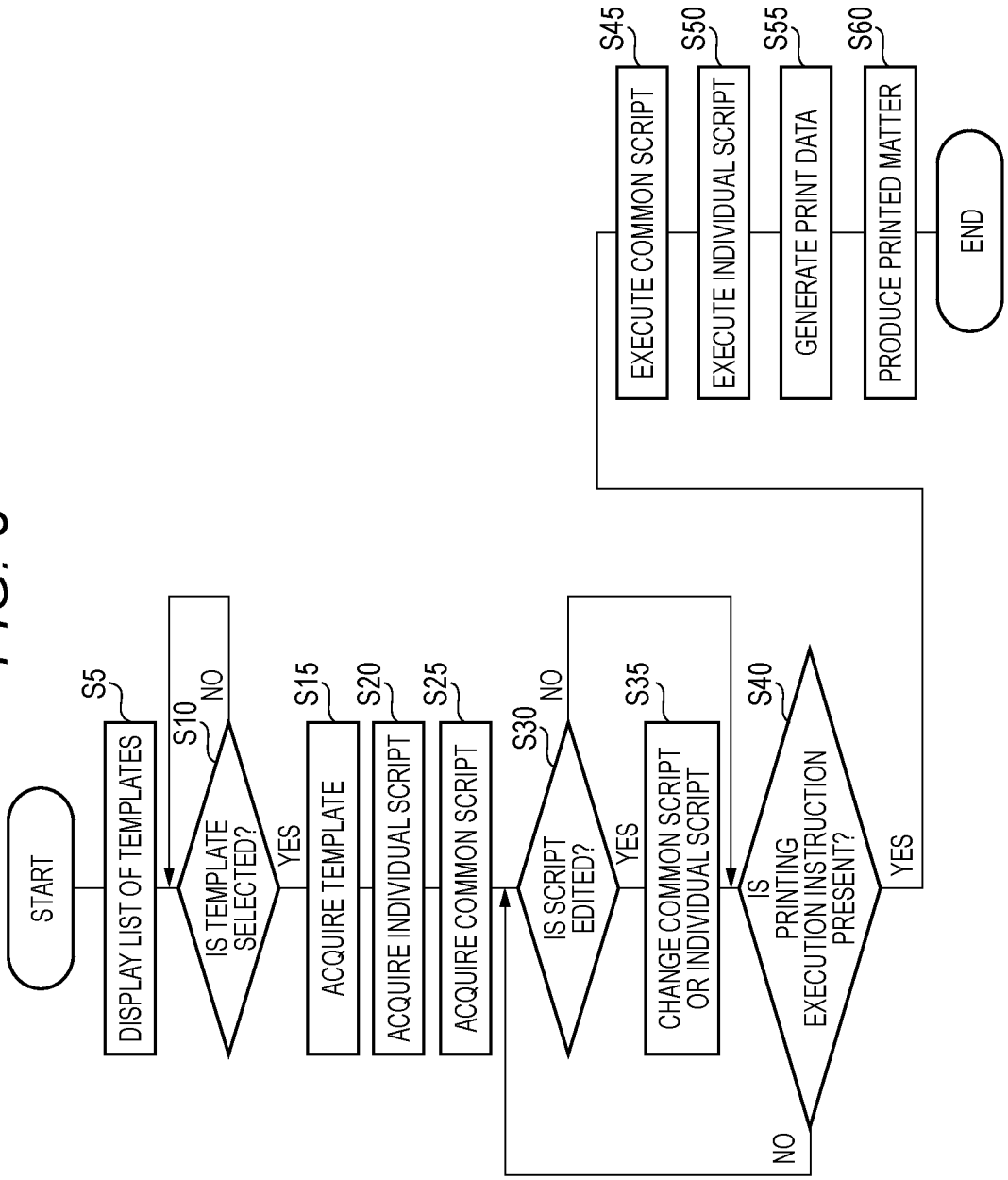

FIG. 8 is a flowchart showing an example of a control procedure executed by a controller of the printer.

Figure 9A:
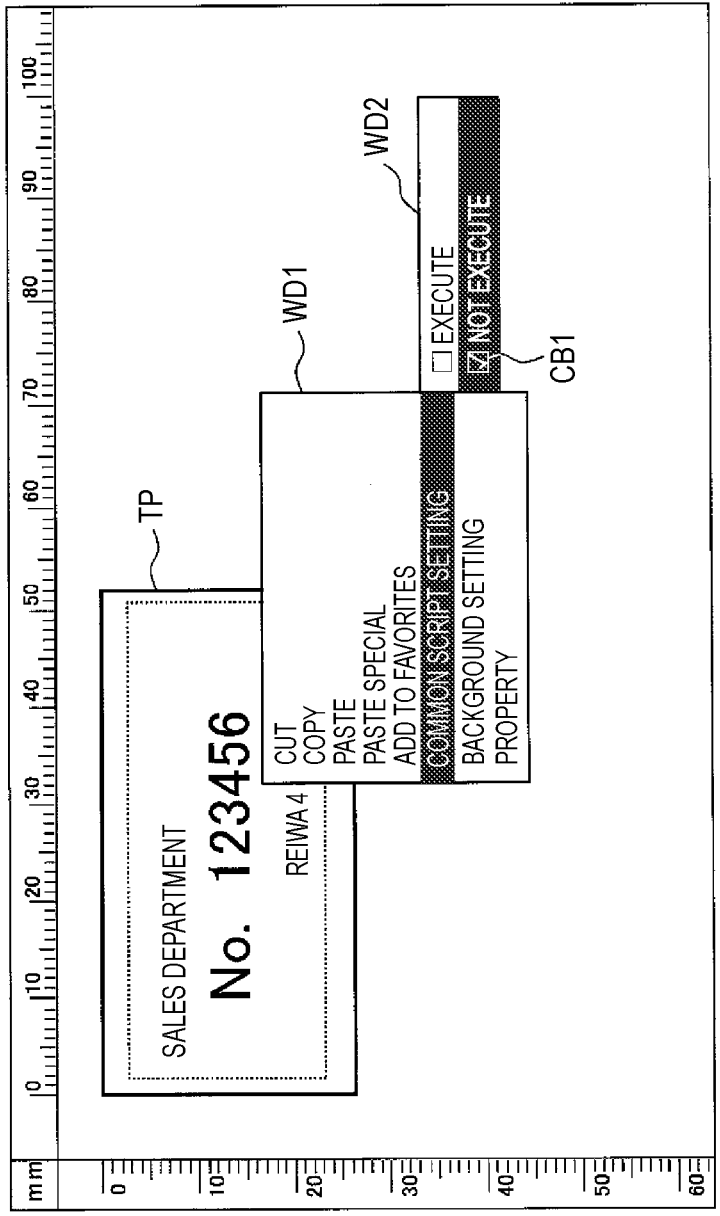
Figure 9B:

FIGS. 9A and 9B are diagrams showing an example of a print editing screen in a case of setting a common script to non-applying with respect to a template and a diagram showing an example of contents of an individual script in a case of setting a common script to non-applying by an individual script.

FIGS. 10A and 10B are diagrams showing an example of a print editing screen based on a template and a diagram showing an example of a setting screen for an undefined object.

Figure 11:
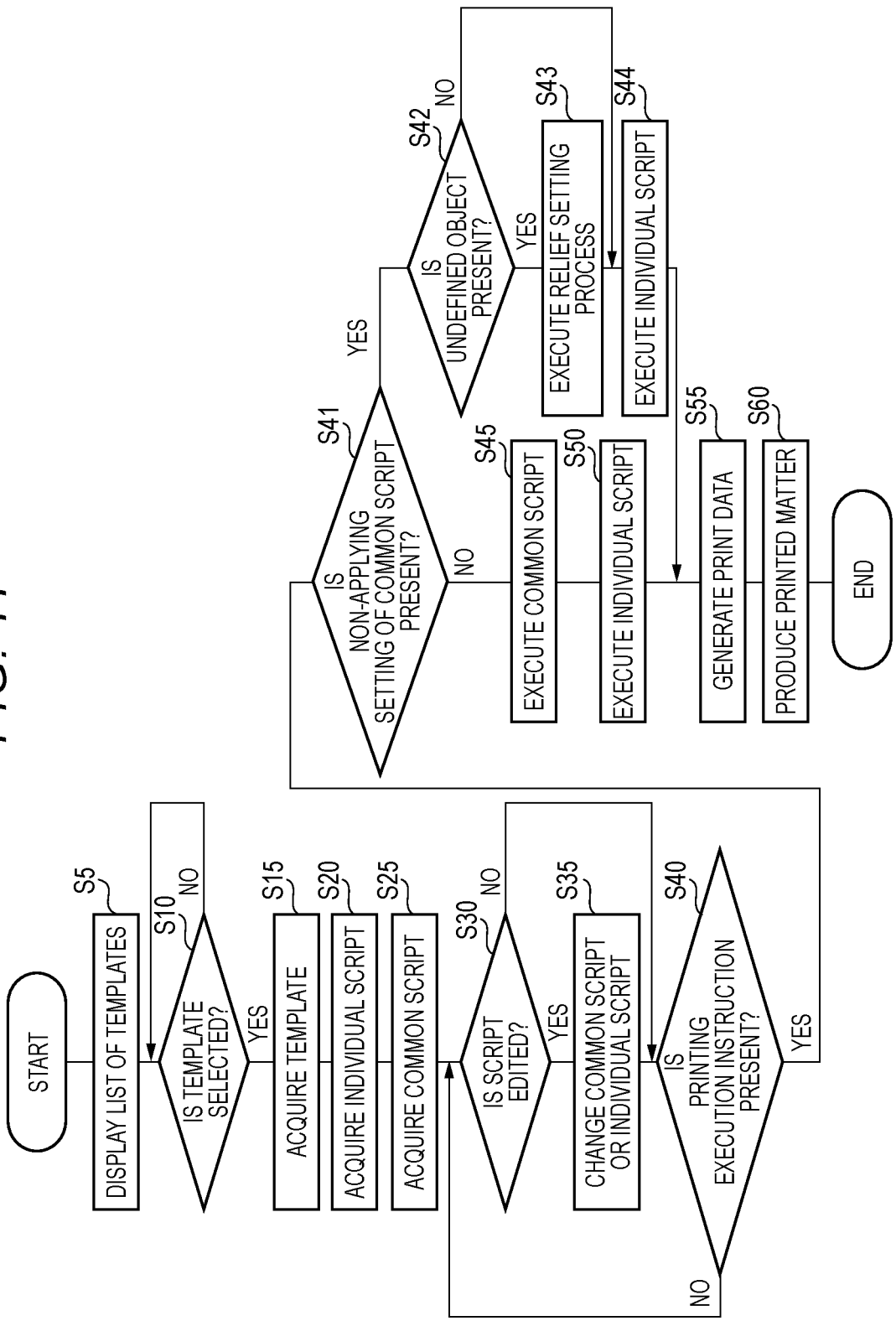

FIG. 11 is a flowchart showing an example of a control procedure executed by a controller of a printer in a modification in which an undefined object generated by non-applying setting of a common script is treated.

Figure 12:
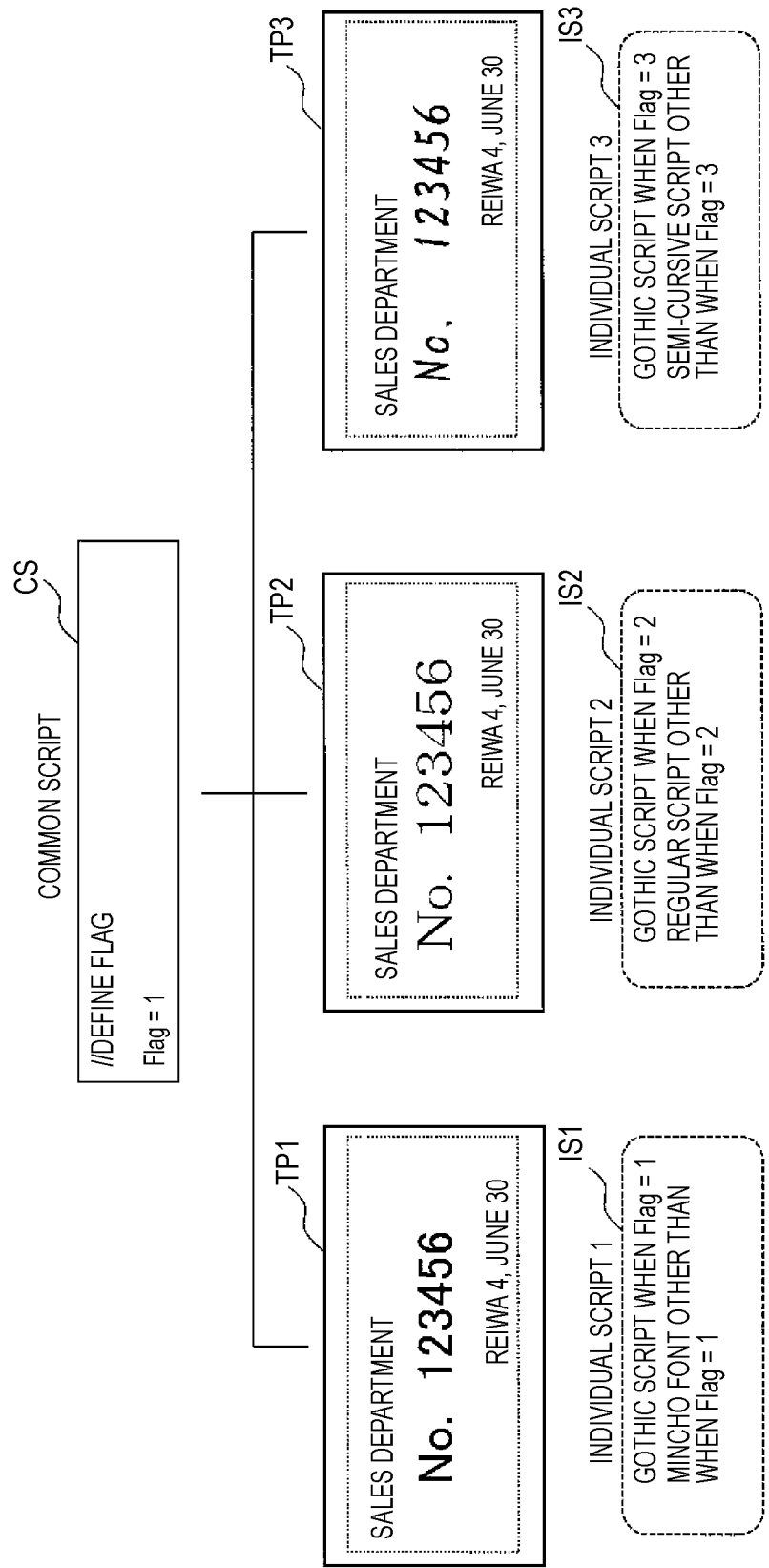

FIG. 12 is a diagram showing an example of a script configuration in a modification in which a condition for defining setting contents is designated for a plurality of templates.

Figure 13:
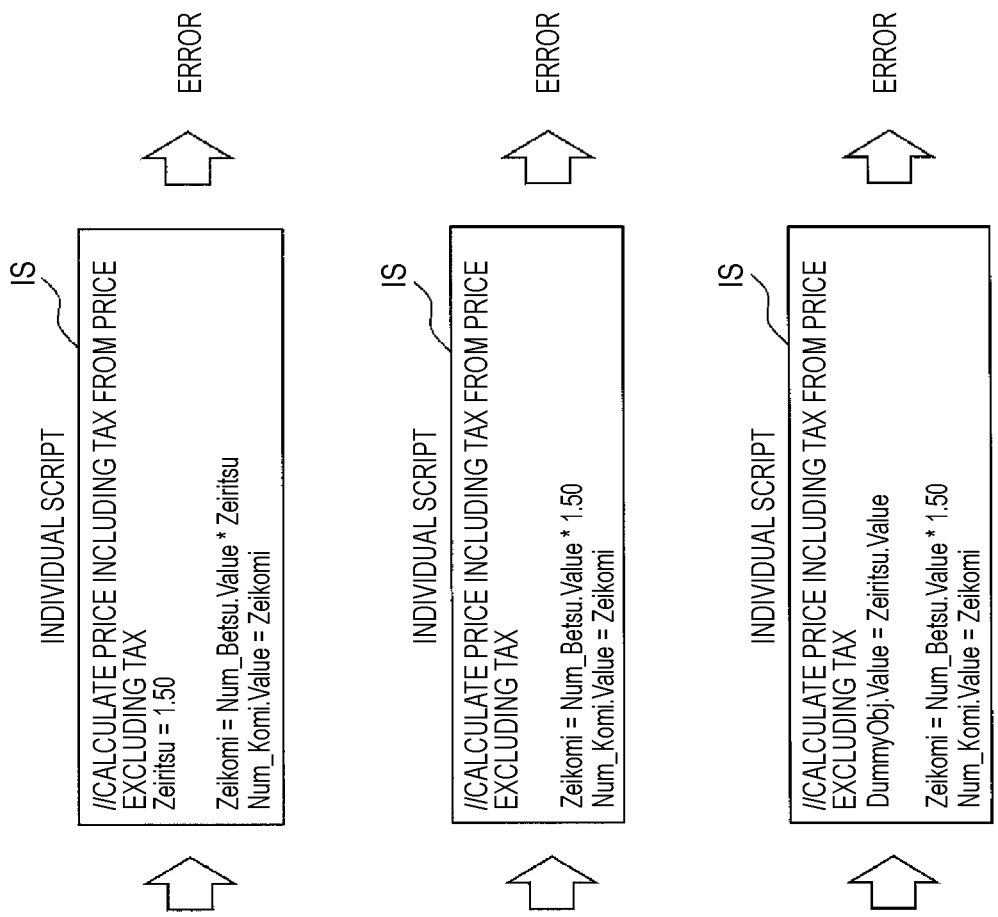

FIGS. 13A, 13B, and 13C are diagrams showing an example, another example, and still another example of contents of a common script and an individual script in a modification in which a change in a value of a variable in an individual script is prohibited.

Figure 14:
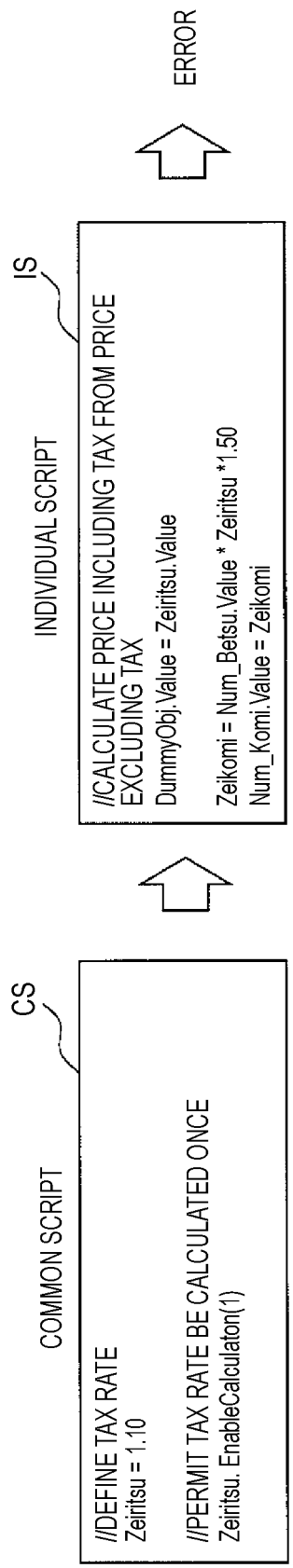

FIG. 14 is a diagram showing an example of contents of a common script and an individual script in a modification in which the number of times that a variable is used for calculation is limited in the individual script.

Figure 15A:
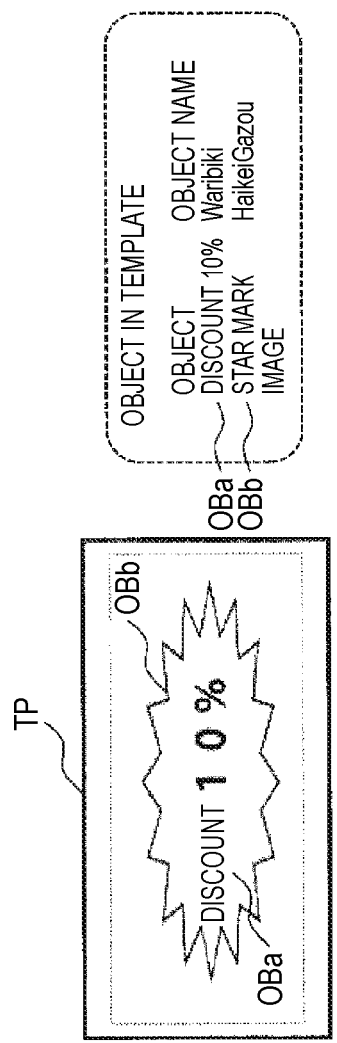
Figure 15B:
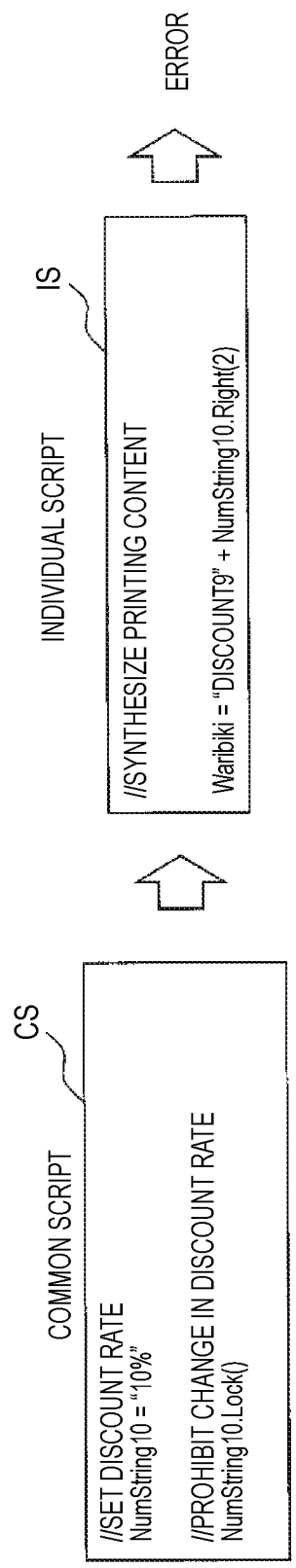

FIGS. 15A and 15B are diagrams showing an example of a template and a diagram showing an example of contents of a common script and an individual script, in a modification in which partial extraction use is prohibited.

<Overall Configuration of Printing System>

Figure 1:
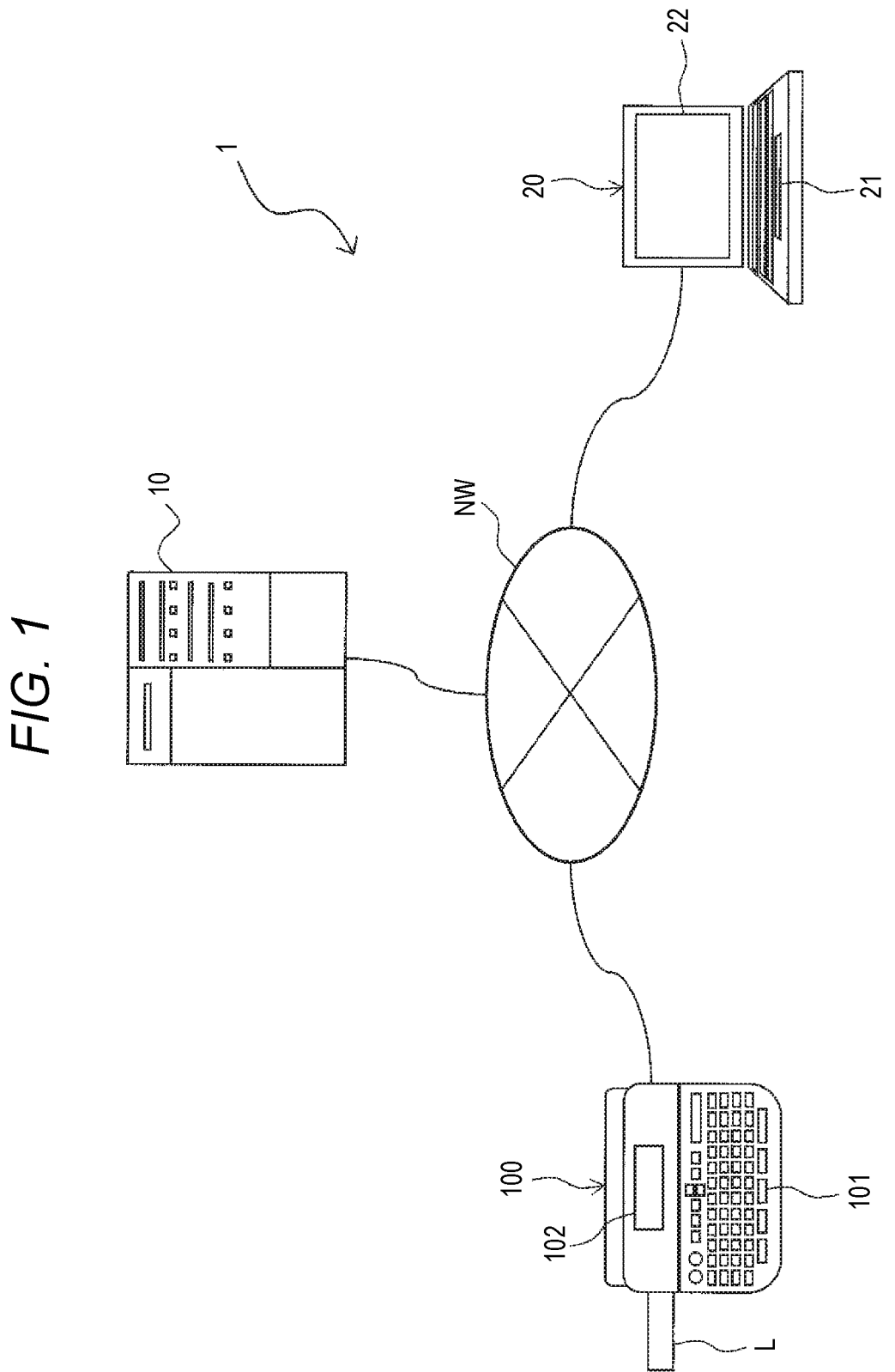
FIG. 1 is a diagram showing an example of an overall configuration of a printing system including a printer according to an embodiment.

FIG. 1 shows an example of an overall configuration of a printing system including a printer according to the present embodiment.

In FIG. 1, a printing system 1 includes a server 10, an operation terminal 20, and a printer 100. The server 10, the operation terminal 20, and the printer 100 are connected via a network NW to be able to transmit and receive information.

Although not shown, the server 10 includes a CPU, a memory including, for example, a RAM and a ROM, a communication controller that performs communication with the operation terminal 20, the printer 100, and the like via the network NW, and a large-capacity memory that includes a hard disk device and the like and stores various types of information. The large-capacity memory stores a template, a common script, an individual script, and the like to be described later.

The operation terminal 20 is, for example, a general-purpose personal computer. The operation terminal 20 may be a notebook personal computer including an operation device 21 and a display 22 as shown in FIG. 1, or may be a desktop personal computer or the like. The operation terminal 20 may be a smartphone including a touch panel, and may be a tablet terminal or the like. Although not shown, the operation terminal 20 includes a CPU, a memory including, for example, a RAM and a ROM, a communication controller that communicates with the server 10, the printer 100, and the like via the network NW, and a large-capacity memory that includes a hard disk device and the like and stores various types of information.

The printer 100 is, for example, a label printer that produces a print label L. The print label L is an example of a printed matter. The printer 100 includes an operation device 101 and a display 102. The operation device 101 is, for example, a keyboard or a button, and receives an input operation by a user. The user may operate the operation unit 101 to input various instructions to the printer 100. The display 102 is, for example, a liquid crystal display, and may display various types of information.

<Functional Configuration of Printer>

Figure 2:
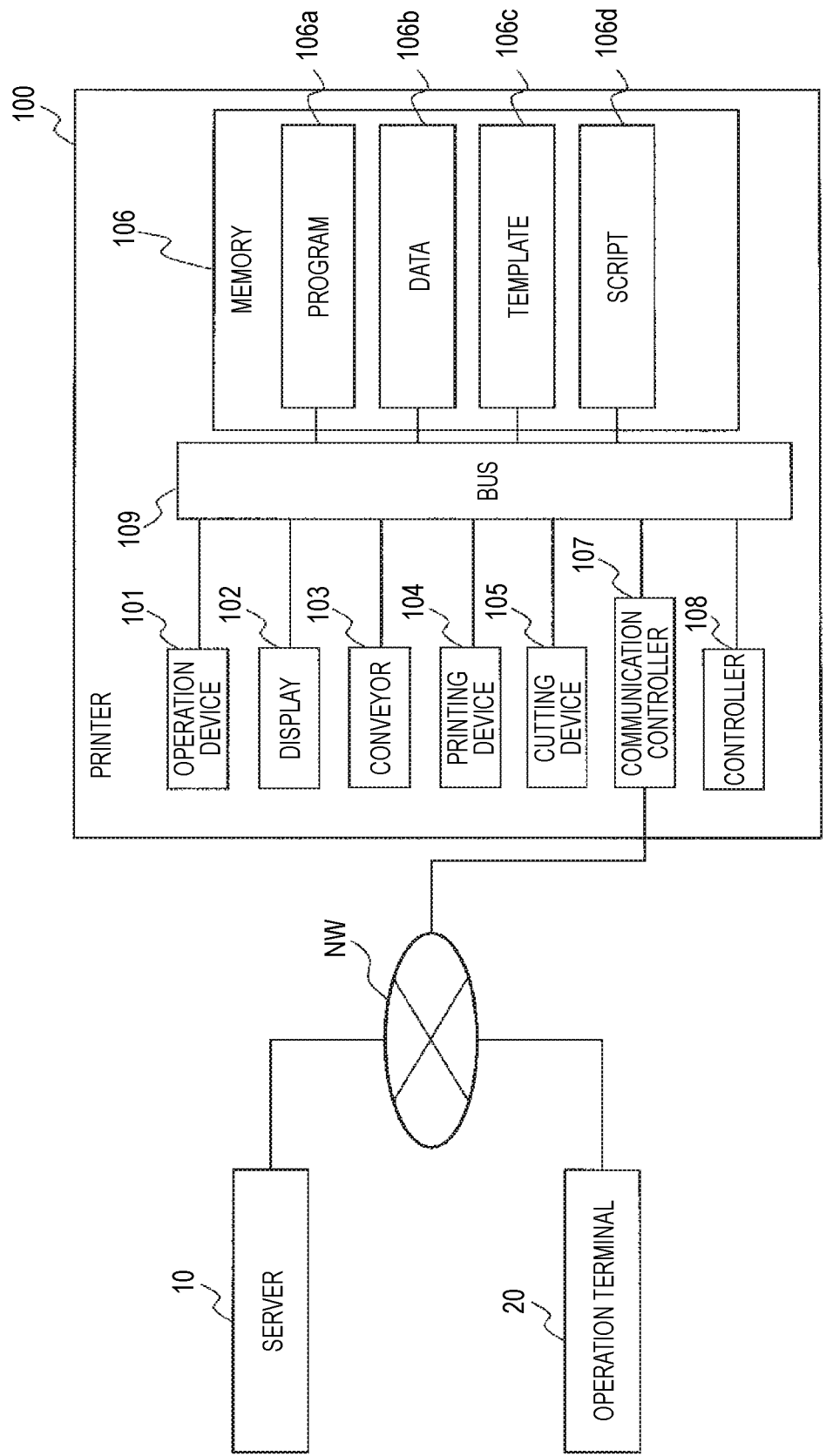
FIG. 2 is a block diagram showing an example of a functional configuration of the printer.

FIG. 2 shows an example of a functional configuration of the printer 100.

As shown in FIG. 2, the printer 100 includes a conveyor 103, a printing device 104, a cutting device 105, a memory 106, a communication controller 107, and a controller 108, in addition to the operation device 101 and the display 102 described above. The operation device 101, the display 102, the conveyor device 103, the printing device 104, the cutting device 105, the memory 106, the communication controller 107, and the controller 108 are connected to be able to transmit and receive information via a bus 109.

The conveyor device 103 conveys printing paper. The printing paper is, for example, roll paper. The conveyor 103 is, for example, a platen roller disposed to face the printing device 104. The conveyor 103 may include a roller other than the platen roller.

The printing device 104 performs printing on the printing paper conveyed by the conveyor 103. The printing device 104 is, for example, a print head disposed to face the platen roller.

The cutting device 105 is disposed downstream of the conveyor 103 and the printing device 104 in a conveying direction of the printing paper. The cutting device 105 cuts the printing paper on which printing is performed by the printing device 104 with a cutter to produce the print label L.

The memory 106 is capable of storing a program 106a, data 106b, a template 106c, and a script 106d. The program 106a includes various programs such as a printing program, which is an example of the firmware program, and a processing program that executes processing shown in flowcharts in FIGS. 8 and 11 to be described later. The data 106b includes various types of data such as image data to be printed. The template 106c includes a plurality of templates to which print objects are allocated in a predetermined mode. The script 106d includes an individual script and a common script. The individual script is a script individually applied to each of a plurality of templates. The common script is one script applied to the plurality of templates or one script commonly applicable to a plurality of individual scripts. The "script" is a simple program that can be easily interpreted and executed by a processor by omitting a conversion operation into a language that can be understood by a computer. The firmware program is stored in the memory 106 in advance. The other program 106a, the data 106b, the template 106c, and the script 106d are acquired from, for example, the server 10 and stored in the memory 106. The memory 106 is an example of a first memory, a second memory, and a third memory.

The communication controller 107 performs communication with the server 10, the operation terminal 20, and the like via the network NW.

The controller 108 is a device that performs data processing, and is, for example, a processor such as a CPU. The controller 108 executes various programs and various scripts stored in the memory 106. The program 106a of the memory 106 and the controller 108 using the program 106a are examples of a controller.

Specific Example of Script

FIGS. 3A to 7 show specific examples of the script. FIGS. 3A, 3B, and 3C are a comparative example for comparison with the present embodiment, in which printing is performed using only the individual script without using the common script. As shown in FIG. 3A, a database DB stores, for example, an item of each product and a price excluding tax. As shown in FIG. 3B, a plurality of print objects OBa to OBe are allocated to the template TP in a predetermined mode. The print object OBa is an object corresponding to a character string of the item, the print object OBb is an object corresponding to a character string of "tax-excluded v", the print object OBc is an object corresponding to a character string of "tax-included v", the print object OBd is an object corresponding to a numerical value of a price excluding tax, and the print object OBe is an object corresponding to a numerical value of a price including tax. In FIG. 3B, for example, the product "chocolate" is selected, and the character string "chocolate" is arranged as the print object OBa. The value "100" of the price excluding tax corresponding to "chocolate" is read from the database DB, and the character string of "100" is arranged as the print object OBd.

An individual script IS shown in FIG. 3C is set in one-to-one correspondence in the template TP shown in FIG. 3B. The individual script IS is a script for calculating the price including tax from the price excluding tax. In FIG. 3C, the individual script IS calculates the price including tax by multiplying the price excluding tax by, for example, a coefficient "1.10" representing a tax rate. By the execution of the individual script IS, the character string of the numerical value "110" as a calculation result is arranged as the print object OBe.

In the case of the comparative example, since the individual script IS is set in one-to-one correspondence for each template TP, it is necessary to recreate all of the plurality of templates TP or the plurality of individual scripts IS into new contents in a case where there is a need to simultaneously change the contents of the templates TP, is inconvenient.

FIG. 4 shows an example of a script configuration according to the present embodiment. In the example shown in FIG. 4, a plurality of individual scripts IS1 to IS3 respectively applied to the plurality of templates TP and one common script CS commonly applied to the individual scripts IS1 to IS3 are provided. Similarly with the individual script IS shown in FIG. 3C, the individual scripts IS1 to IS3 are scripts for calculating the price including tax from the price excluding tax. In the individual scripts IS1 to IS3, a variable "Zeiritsu" representing the tax rate is used instead of the coefficient "1.10" representing the tax rate. The common script CS defines a value of the variable "Zeiritsu" included in the individual scripts IS1 to IS3. The common script CS is rewritable, and the value of the variable "Zeiritsu" may be changed in accordance with a change instruction by the user. Contents of the individual scripts IS1 to IS3 may also be changed in accordance with a change instruction by the user.

The individual scripts IS1 to IS3 and the common script CS are acquired from, for example, the server 10 at an appropriate timing and stored in the memory 106 of the printer 100. The controller 108 reads and acquires the individual scripts IS1 to IS3 and the common script CS from the memory 106. The controller 108 first executes the common script CS and applies the common script CS to the applying target individual scripts IS1 to IS3 to set the variable "Zeiritsu" in the individual scripts IS1 to IS3 to a value defined by the common script CS. In FIG. 4, for example, "1.10" is defined. Next, the controller 108 sets the value defined by the common script CS as the value of the variable "Zeiritsu" included in the individual scripts IS1 to IS3, executes the individual scripts IS1 to IS3, and applies the individual scripts IS1 to IS3 to the corresponding template TP. The controller 108 generates a character string corresponding to the value of the variable in the corresponding template TP by the execution of the individual scripts IS1 to IS3. The values of the variables representing the tax rates in the plurality of individual scripts IS1 to IS3 can be simultaneously set by the common script CS.

FIG. 5 shows another example of the script configuration according to the present embodiment. In the example shown in FIG. 5, one common script CS applied to the plurality of templates TP1 to TP3 is provided. As shown in FIG. 5, a plurality of print objects OB1a to OB1c are allocated to the template TP1 in a predetermined mode. The print object OB1a is an object corresponding to a symbol of a barcode, the print object OB1b is an object corresponding to a character string of "Heisei", which is an era, and the print object OB1c is an object corresponding to the character string of "30, April 6", which is a date.

A plurality of print objects OB2a to OB2d are allocated to the template TP2 in a predetermined mode. The print object OB2a is an object corresponding to a character string of "sales department", which is a department, the print object OB2b is an object corresponding to a character string of "No. 123456", which is a serial number, the print object OB2c is an object corresponding to a character string of "Heisei", which is an era, and the print object OB2d is an object corresponding to a character string of "2, December 9", which is a date.

A plurality of print objects OB3a to OB3d are allocated to the template TP3 in a predetermined mode. The print object OB3a is an object corresponding to a character string of "Heisei", which is an era, the print object OB3b is an object corresponding to a character string of "12, July 7", which is a date, the print object OB3c is an object corresponding to a character string of "MANILA CLAM AND MUSHROOM", which is the product name, and the print object OB3d is an object corresponding to a character string of "40 g", which is a weight.

The common script CS defines the contents of the print objects OB1b, OB2c, and OB3a representing the character strings of the era included in the individual scripts IS1 to IS3 as "Reiwa". The print objects OB1b, OB2c, and OB3a are examples of a variable object. The common script CS is rewritable, and the content thereof may be changed in accordance with a change instruction by the user. The common script CS is acquired from, for example, the server 10 at an appropriate timing and stored in the memory 106 of the printer 100. The controller 108 reads and acquires the common script CS from the memory 106 and applies the common script CS to the plurality of templates TP1 to TP3. The controller 108 sets the print objects OB1b, OB2c, and OB3a included in the templates TP1 to TP3, respectively, to be "Reiwa", which is the content defined by the common script CS. Accordingly, the era in the plurality of templates TP1 to TP3 can be simultaneously changed from "Heisei" to "Reiwa".

FIG. 6 shows still another example of the script configuration according to the present embodiment. In the example shown in FIG. 6, in addition to the above-described print objects OB3a to OB3d, print objects OB3e to OB3h are allocated to the template TP3 in a predetermined mode. The print object OB3e is an object corresponding to a character string of "tax-excluded v", the print object OB3f is an object corresponding to a character string of "tax-included v", the print object OB3g is an object corresponding to a numerical value of a price excluding tax, and the print object OB3h is an object corresponding to a numerical value of a price including tax. The individual script IS3 is set corresponding to the template TP3. The individual script IS3 calculates the price including tax from the price excluding tax. The common script CS defines the value of the variable "Zeiritsu" included in the individual script IS3. In addition, the common script CS defines the contents of the print objects OB1b, OB2c, and OB3a representing the character string of the era included in the individual scripts IS1 to IS3 as "Reiwa".

The controller 108 first executes the common script CS and applies the common script CS to the applying target templates TP1 to TP3. Accordingly, "Heisei" of the print objects OB1b, OB2c, and OB3a in the templates TP1 to TP3, respectively, is changed to the content "Reiwa" defined by the common script CS. The controller 108 executes the common script CS and applies the common script CS to the individual script IS3. By the execution of the common script CS, the variable "Zeiritsu" included in the individual script IS3 is set to the value defined by the common script CS. The controller 108 applies, to the template T3 to which the common script CS is applied, the individual script IS3 corresponding to the template TP3 under the applying condition. Accordingly, the individual script IS3 is applied to the template TP with the value defined by the common script CS as the value of the variable "Zeiritsu".

FIG. 7 shows still another example of the common script CS. As shown in FIG. 7, the common script CS defines, by a conditional expression, a change condition for the contents of the print objects OB1*b*, OB2*c*, and OB3*a* included in the plurality of templates TP1 to TP3, respectively. The controller 108 changes the contents of the print objects OB1*b*, OB2*c*, and OB3*a* by applying the conditional expression defined by the common script CS to the applying target templates TP1 to TP3. In the example shown in FIG. 7, the common script CS defines, by the conditional expression, the case where the content of the print object is "Heisei" as the change condition, and changes the content to "Reiwa" when the content is "Heisei". In this case, even if the print objects OB1*b*, OB2*c*, and OB3*a* to be processed are not designated one by one, it is possible to search an object having such a character string in the common script CS and change the object.

<Control Procedure>

FIG. 8 shows an example of a control procedure executed by the controller 108 of the printer 100 in order to implement the above-described processing. For example, in a case where there is an instruction to produce the print label L in the operation terminal 20 or the printer 100, the controller 108 starts this flowchart.

In step S5, the controller 108 displays a list of the templates TP on the display 22 of the operation terminal 20. The list may be, for example, a list of names of the templates TP or an image such as a thumbnail. The controller 108 may display the list of the templates TP on the display 102 of the printer 100.

In step S10, the controller 108 determines whether a specific template TP is selected by the user. The template TP may be selected via the operation device 21 of the operation terminal 20 or via the operation device 101 of the printer 100. The controller 108 repeats the step S10 until the template TP is selected (step S10: No), and when the template TP is selected (step S10: Yes), the process proceeds to the next step S15.

In step S15, the controller 108 acquires the template TP selected in the step S10. The controller 108 may acquire the template TP from, for example, the server 10. When the template TP is already acquired from the server 10 and stored in the memory 106, the controller 108 may read and acquire the template TP from the memory 106.

In step S20, the controller 108 acquires the individual script IS corresponding to the template TP acquired in the step S15. The controller 108 may acquire the individual script IS from, for example, the server 10. When the individual script IS is already acquired from the server 10 and stored in the memory 106, the controller 108 may read and acquire the individual script IS from the memory 106.

In step S25, the controller 108 acquires the common script CS corresponding to the template TP acquired in the step S15. The controller 108 may acquire the common script CS from, for example, the server 10. When the common script CS is already acquired from the server 10 and stored in the memory 106, the controller 108 may read and acquire the common script CS from the memory 106.

In step S30, the controller 108 determines whether an editing screen for the common script CS or the individual script IS is opened by the user and editing is performed. When the editing is not performed (step S30: No), the controller 108 proceeds to the step S40 to be described later. When the editing is performed (step S30: Yes), the controller 108 proceeds to the next step S35.

In step S35, the controller 108 changes the content of the common script CS or the individual script IS in accordance with the change instruction input in the step S30. The step S35 is an example of change processing.

In step S40, the controller 108 determines whether a printing execution instruction is given by the user. The printing execution instruction may be given via the operation device 21 of the operation terminal 20 or via the operation device 101 of the printer 100. When there is no printing execution instruction (step S40: No), the controller 108 returns to the step S30. When a printing execution instruction is given (step S40: Yes), the controller 108 proceeds to the next step S45.

In step S45, the controller 108 executes the common script CS acquired in the step S25 and applies the common script CS to the applying target template TP or individual script IS. The step S45 is an example of first applying processing.

In step S50, the controller 108 executes the individual script IS acquired in the step S20 and applies the individual script IS to the applying target template TP. The step S50 is an example of second applying processing.

In step S55, the controller 108 generates a character string corresponding to the applying of the common script CS and the individual script IS in the corresponding template TP by the applying of the common script CS and the individual script IS executed in the step S45 and the step S50, respectively, and generates print data.

In step S60, the controller 108 causes the printing device 104 to print the print data generated in the step S55 on the printing paper, and produces the print label L. This is the end of this flowchart.

When the individual script IS is not executed as in the case shown in FIG. 5 described above, the steps S20 and S50 are omitted.

Effects of Embodiment

The printer 100 includes the printing device 104, the controller 108, and the memory 106. The memory 106 may store the plurality of templates TP, and the printer 100 generates the print label L using the templates TP. When it is desired to perform content change for the plurality of templates TP in the printer 100, the common script CS is used. The memory 106 may store the common script CS. When the common script CS is stored in the memory 106, the common script CS can be read and be applied to the plurality of templates TP. Alternatively, the printer 100 may further use the plurality of individual scripts IS. The individual scripts IS are applied to the corresponding templates TP. In this case, the common script CS can be applied to the plurality of individual scripts IP.

In order to use the common script CS, the controller 108 of the printer 100 executes the step S45. The common script CS is applied to the applying target template TP or individual script IS by the step S45. When the applying target is the template TP, it is possible to simultaneously change the contents of the plurality of target templates TP by applying the common script CS. When the applying target is the individual script IS, it is possible to simultaneously change the contents of the plurality of target individual scripts IS by applying the common script CS, and to simultaneously change the contents of the templates TP to which the respective individual scripts IS are applied by the change.

According to the present embodiment, it is possible to easily change the contents of the plurality of templates TP and to improve convenience by using the common script CS applicable to the plurality of templates TP or the plurality of individual scripts IS.

Further, particularly in the present embodiment, a user can appropriately change the content of the common script CS. According to the present embodiment, it is possible to easily perform content change for the plurality of templates TP and to improve convenience.

Further, particularly in the present embodiment, the individual script IS may be individually applied to each template TP. In this case, it is also possible to simultaneously change the contents of the individual scripts IS by the common script CS, thereby simultaneously changing the contents of the templates TP to which the respective individual scripts IS are applied.

Further, particularly in the present embodiment, when the common script CS is applied to the template TP, the common script CS is first applied to the template TP, and the corresponding individual script IS is applied to the template TP under the applying condition. When the common script CS is applied to the individual script IS, the common script CS is first applied to the individual script IS, and the applied individual script IS is applied to the template TP. According to the present embodiment, the definition contents in the common script CS can be reflected in the plurality of templates TP, and the content change for the plurality of templates TP can be easily performed.

Further, particularly in the present embodiment, the value of the variable of the individual script IS can be set by the common script CS. According to the present embodiment, it is possible to easily perform content change for the plurality of templates TP via the set individual script IS.

Further, particularly in the present embodiment, the character string corresponding to the value of the variable can be generated in the template TP by the individual script IS after the value of the variable is set by the common script CS. According to the present embodiment, user convenience can be improved.

Further, particularly in the present embodiment, the common script CS can be set such that the variable object in the template TP is the content defined by the common script CS. According to the present embodiment, it is possible to easily perform content change for the plurality of templates TP.

Further, particularly in the present embodiment, it is possible to easily perform content change for the plurality of templates TP by applying the conditional expression defined in the common script CS to each template TP. According to the present embodiment, it is possible to search an object having a specific character string in the common script CS without designating print objects to be processed one by one and change the object.

Modification

The above-described embodiment is not limited to the contents described above, and various modifications can be made without departing from the gist and technical idea thereof. Hereinafter, such modifications will be described in order.

<Case where Non-Applying of Common Script is Set>

The common script may be set to non-applying.

FIGS. 9A and 9B show a specific example of a method for setting the common script CS to non-applying. FIG. 9A is an example of a print editing screen in a case where the common script CS is set to non-applying with respect to the template TP. The print editing screen is displayed on the display 22 of the operation terminal 20, for example. As shown in FIG. 9A, print data in which a character string corresponding to the applying of the common script CS or the individual script IS is generated in the template TP is displayed on the print editing screen. A menu window WD1 is displayed by an appropriate operation by a user. A plurality of setting menus including "common script setting" are displayed on the menu window WD1 to be selectable. In a case where the "common script setting" is selected, a setting window WD2 is displayed. A checkbox CB1 for setting whether to execute a common script is displayed on the setting window WD2. By checking the checkbox CB1 of "not execute", it is possible to set not to apply the common script CS with respect to the template TP displayed on the print editing screen. The template TP in which it is set not to apply the common script CS by the setting window WD2 is an example of a first specific template.

FIG. 9B is an example of the content of the individual script IS in the case where the common script CS is set to non-applying by the individual script IS. As shown in FIG. 9B, non-applying of the common script CS is defined in the individual script IS. By applying the individual script IS, it is possible to set not to apply the common script CS to the corresponding template TP. The template TP set not to apply the common script CS by the individual script IS is an example of a second specific template.

In the present modification, the controller 108 applies the common script CS to the template TP for which it is set not to apply the common script CS by the setting window WD2, or a template TP other than the template TP for which it is set not to apply the common script CS by the individual script IS.

According to the present modification, a user may set the template TP in which the content change by the common script CS is not executed in an exceptional manner as desired, thereby further improving convenience. For example, in a case where a discount rate is defined by the common script CS, when there is a product which is not desired to be discounted, it is possible to flexibly cope with the above-described case by setting non-applying of the common script CS with respect to the template TP corresponding to the product.

<Case where Undefined Object Generated by Non-Applying Setting of Common Script is Treated>

When the common script CS is not executed by the above-described non-applying setting, an undefined object may be generated in the corresponding individual script IS. For example, in the script configuration shown in FIG. 4, when the common script CS is not executed, the value of the variable "Zeiritsu" in the individual scripts IS1 to IS3 is undefined. When an undefined object is generated by the non-applying setting of the common script in this way, the undefined object may be set to be treated.

FIGS. 10A and 10B show a specific example of a method for setting an undefined object. FIG. 10A is an example of a print editing screen using a template. As shown in FIG. 10A, in a case where the user performs an appropriate operation on the print editing screen, a menu window WD3 is displayed. A plurality of setting menus including "undefined object setting" are displayed on the menu window WD3 to be selectable. In a case where "undefined object setting" is selected, a setting screen for an undefined object is displayed. FIG. 10B is an example of a setting screen for an undefined object. As shown in FIG. 10B, a checkbox CB2 for setting whether to execute an error, a numerical value input device 30, a character string input device 31, and an "OK" button 32 are displayed on a setting window WD4. In a case where the checkbox CB2 is not checked, an input is made to the numerical value input device 30 or the character string input device 31, and the "OK" button 32 is operated, an undefined object is defined by the numerical value input to the numerical value input device 30 or the character string input to the character string input device 31. In a case where the checkbox CB2 is checked and the "OK" button 32 is operated, when an undefined object is generated, error processing is executed and production of a printed matter is not performed. In this case, the numerical value input device 30 and the character string input device 31 are grayed out, for example, and cannot be input.

FIG. 11 shows an example of a control procedure executed by the controller 108 of the printer 100 in order to implement the above-described processing. The flowchart shown in FIG. 11 is a control procedure in a case where the checkbox CB2 is not checked in the setting window WD4 and an input is made to the numerical value input device 30 or the character string input device 31. In FIG. 11, the same steps as those in FIG. 8 are denoted by the same reference numerals, and the description thereof will be appropriately omitted.

The steps S5 to S40 are the same as those in FIG. 8 described above. In step S41, the controller 108 determines whether non-applying of the common script CS is set for the template TP to be processed. In a case where it is determined that the non-applying of the common script CS is not set (step S41: No), the controller 108 proceeds to step S45. In a case where it is determined that the non-applying of the common script CS is set (step S41: Yes), the controller 108 proceeds to step S42.

In step S42, the controller 108 determines whether an undefined object is generated in the individual script IS due to non-applying of the common script CS. In a case where no undefined object is generated (step S42: No), the controller 108 proceeds to step S44 to be described later. In a case where an undefined object is generated (step S42: Yes), the controller 108 proceeds to the next step S43.

In step S43, the controller 108 defines an undefined object based on the numerical value input to the numerical value input device 30 or the character string input to the character string input device 31 of the setting window WD4. Accordingly, an undefined portion is relieved. The step S43 is an example of relief setting processing.

In step S44, the controller 108 executes the individual script IS defined for the undefined object in the step S43, and applies the individual script IS to the applying target template TP. Thereafter, the process proceeds to step S55.

Since the steps S45 to S60 are the same as those in FIG. 8 described above, description thereof will be omitted. The processing procedure including at least the step S43 in the flowchart may be executed based on a predetermined program other than the firmware program or may be executed based on the firmware program.

According to this modification, when the exceptional setting in which the common script CS is not executed is performed, it is possible to prevent the occurrence of an undefined portion in the individual script IS and the occurrence of an error, and thus it is possible to improve convenience.

<Case of Designating Conditions for Defining Setting Contents for Plurality of Templates>

A condition for defining the setting content for the plurality of templates TP may be designated by the common script CS.

FIG. 12 shows an example of a script configuration according to the present modification. In the example shown in FIG. 12, the plurality of individual scripts IS1 to IS3 applied to the plurality of templates TP1 to TP3, respectively, and one common script CS commonly applied to the individual scripts IS1 to IS3 are provided. In the individual scripts IS1 to IS3, a set including conditions and contents corresponding to the respective conditions is defined, and in the common script CS, a condition is given such that the set content is defined in the set included in the individual scripts IS1 to IS3. Specifically, as shown in FIG. 12, the individual scripts IS1 to IS3 are scripts that define the typeface of the character strings in the templates TP1 to TP3, for example. The individual script IS1 defines the typeface of the template TP1 such that the Gothic script is set when the flag is "1", and the Mincho font is set when the flag is other than "1". The individual script IS2 defines the typeface of the template TP2 such that the Gothic script is set when the flag is 2, and the Regular script is set when the flag is other than 2. The individual script IS3 defines the typeface of the template TP3 such that the Gothic script is set when the flag is 3, and the Semi-cursive script is set when the flag is other than 3. The common script CS defines the value of the flag. The common script CS is rewritable, and the value of the flag may be changed in accordance with a change instruction by the user.

The controller 108 first executes the common script CS and applies the common script CS to the templates TP1 to TP3. Accordingly, flags applied to the templates TP1 to TP3 are defined. The controller 108 executes the individual scripts IS1 to IS3 corresponding to the respective templates TP1 to TP3 and applies the individual scripts IS1 to IS3 to the respective templates TP1 to TP3 under the applying condition. Accordingly, the individual scripts IS1 to IS3 are applied to the respective templates TP1 to TP3 so as to be setting contents based on the value of the flag defined by the common script CS. In FIG. 12, for example, since the flag is 1, the typeface of the template TP1 is set to Gothic script, the typeface of the template TP2 is set to Regular script, and the typeface of the template TP3 is set to the Semi-cursive script.

According to the present modification, the condition included in the set defined by the individual scripts IS1 to IS3 can be given from the common script CS. The setting contents corresponding to the respective conditions are executed by the individual scripts IS1 to IS3, and the content change for the plurality of templates TP1 to TP3 can be easily performed. Since each template can be changed separately in response to a command from the common script CS, the flexibility for the command to the plurality of templates can be improved.

<Case where Change in Value of Variable for Individual Script is Prohibited>

For example, important information, such as a tax rate or a discount rate, which cannot be easily changed without permission, may be defined in the common script CS. Here, the change in the value of the specific variable in the individual script IS may be prohibited in the common script CS such that the value of the specific variable defined by the common script CS is not changed in the individual script IS without permission.

FIG. 13A shows an example of the contents of the common script CS and the individual script IS according to the present modification. As shown in FIG. 13A, the common script CS defines the value of the variable "Zeiritsu" and prohibits the change in the value of the variable. In this case, when the value of the variable "Zeiritsu" is set to a different value in the individual script IS, the error processing is executed and production of a printed matter is not performed.

According to this modification, in the common script CS to be executed first, the value of the variable can be prevented from being changed by the individual script IS to be executed later without permission.

As described above, even when the change in the value of the variable "Zeiritsu" is prohibited in the common script CS, for example, it is possible to directly designate a numerical value without using the variable "Zeiritsu" in the individual script IS. As shown in FIG. 13B, when the variable "Zeiritsu" is not used at all in the individual script IS, the error processing may be executed. Accordingly, it is possible to block a passage of falsification as described above.

As described above, even in the case where the error processing is executed when the variable "Zeiritsu" is not used in the individual script IS, it is possible to avoid an error by using the variable in the individual script IS in a meaningless manner, for example. The "meaningless use" is, for example, a use that does not affect a print result, that is, a use that does not directly change the content of the object to be printed. As shown in FIG. 13C, when the variable "Zeiritsu" is used in the individual script IS in a meaningless manner, the error processing may be executed. Accordingly, it is possible to block a passage of falsification as described above.

<Case where Number of Times that Variable is Used for Calculation in Individual Script is Limited>

The number of times that the variable is used for calculation in the common script CS may be limited such that the specific variable defined by the common script CS is not used illegally in the individual script IS.

FIG. 14 shows an example of the contents of the common script CS and the individual script IS according to the present modification. As shown in FIG. 14, the common script CS defines the value of the variable "Zeiritsu" and limits the number of times that the variable is used for the calculation to, for example, one. In this case, for example, a case where in the individual script IS, the variable "Zeiritsu" is illegally used by multiplying the numerical value of the price excluding tax by the variable "Zeiritsu" and further by the coefficient "1.50" is considered. In this case, since two calculations of multiplying the variable "Zeiritsu" by the numerical value of the price excluding tax and by the coefficient "1.50" are executed, the error processing is executed and the production of a printed matter is not performed.

According to the present modification, it is possible to prevent the specific variable defined by the common script CS from being illegally used in the individual script IS.

<Case where Partial Extraction Use is Inhibited>

Partial extraction use of the variable may be prohibited in the common script CS such that the specific variable defined by the common script CS is partially extracted in the individual script IS and is not illegally used.

FIG. 15A shows an example of the template TP according to the present modification. As shown in FIG. 15A, the plurality of print objects OBa and OBb are allocated to the template TP in a predetermined mode. The print object OBa is an object corresponding to a character string of "10% discount", and the print object OBb is an object corresponding to an image of "star mark". As shown in FIG. 15B, the definition related to the predetermined character string is made in the common script CS corresponding to the template TP, and the change in the character string by the individual script IS is prohibited. In FIG. 15B, for example, the character string of the numerical value of the discount rate is defined as "10%", and the change in the character string of the numerical value of the discount rate is prohibited.

In this case, as shown in FIG. 15B, when processing of partially extracting the character string of the numerical value of the discount rate and combining the character string with another character string is executed in the individual script IS, error processing may be executed. In a case where the individual script IS shown in FIG. 15B is temporarily executed, the character string of "discount 9" and the right two characters of "discount 10%" are combined and changed to "discount 90%". According to the present modification, it is possible to prevent abuse, in the common script CS to be executed first, caused by partial extraction of a character string in the individual script IS to be executed later.

<Case where Authentication is Required for Changing Content of Common Script>

As described above, the common script CS may define information that cannot be changed without permission. Therefore, authentication may be required for changing the content of the common script CS. The authentication may be required for changing the content of the individual script IS, or the authentication may not be required for the individual script IS for ease of operation.

As the authentication method, the following method is conceivable. For example, an administrator password may be set in advance, and it may be necessary to input the administrator password in order to open the editing screen of the common script CS. In a case where a digital signature is not attached to the data of the changed common script CS, the common script CS may not be changed. In a case where a device of an acquisition destination from which the changed common script CS is acquired is not a physical authentication device, the common script CS may not be acquired. The physical authentication device is, for example, a USB dongle key.

According to the present modification, the common script CS in which important information is defined cannot be changed without permission, and thus the security can be enhanced.

The flowcharts shown in FIGS. 8 and 11 do not limit the present disclosure to the procedures shown in the above flow, and addition, deletion, change in the order, and the like of the procedures may be made without departing from the gist and the technical idea of the disclosure.

In addition to the above, the methods according to the embodiment and the modifications may be appropriately combined and used.

In addition, although not shown, the present disclosure may be carried out with various modifications within a scope not departing from the gist thereof

What is claimed is:

1. A printer comprising:
    at least one memory configured to store a first template, a second template, and a common script; and
    a controller including at least one processor, the controller configured to execute first applying processing, the first applying processing including:
    processing to apply the common script stored in the at least one memory to the first template in the at least one memory;
    processing to apply the common script to a first individual script when the first template is corresponded to the first individual script;

processing to apply the first individual script to the first template in a first case where the common script is applied to the first individual script;
processing to apply the common script to the second template in the at least one memory; and
processing to apply the common script to a second individual script when the second template is corresponded to the second individual script; and
processing to apply the second individual script to the second template in a second case where the common script is applied to the second individual script.

2. The printer according to claim 1, wherein
the common script is configured to be rewritable, and
the controller is configured to execute change processing of changing a content of the common script in accordance with an acquired change instruction.

3. The printer according to claim 1, wherein
the at least one memory is configured to store at least one of the first individual script and the second individual script, and
the controller is configured to execute second applying processing, the second applying processing including:
processing to apply the first individual script to the first template when the first template is corresponded to the first individual script stored in the at least one memory; and
processing to apply the second individual script to the second template when the second template is corresponded to the second individual script stored in the at least one memory.

4. The printer according to claim 3, wherein
the controller is configured to
in the first applying processing, apply the common script to the first template,
in the first applying processing, apply the common script to the second template,
in the second applying processing, apply the first individual script to the first template to which the common script is applied when the first template is applied to the first individual scrip
in the second applying processing, apply the second individual script to the second template to which the common script is applied when the second template is applied to the second individual scrip.

5. The printer according to claim 4, wherein
the common script includes a variable in which a value is defined,
the controller is configured to
in the first applying processing, when the first individual script includes the variable, apply the common script including the variable in which the value is defined to the first individual script to set a value of the variable in the first individual script to the value defined by the common script, and
in the second applying processing, when the first individual script includes the variable, apply the first individual script defined by the common script to the first template to set a value of the variable in the first template to the value defined by the common script.

6. The printer according to claim 5, wherein
in the second applying processing, the controller is configured to generate a character string corresponding to the value of the variable in the first template when the first individual script includes the variable.

7. The printer according to claim 1, wherein
the common script defines a content of a variable object, and
in the first applying processing, the controller is configured to
when the first template includes the variable object, apply the content defined by the common script to the first template to set a content of the variable object in the first template to the content defined by the common script, and
when the second template includes the variable object, apply the content defined by the common script to the second template to set a content of the variable object in the second template to the content defined by the common script.

8. The printer according to claim 1, wherein
the common script includes a conditional expression in which a change condition for a content of a variable object is defined, and
in the first applying processing, the controller is configured to
when the first template includes the variable object, apply the common script including the conditional expression to the first template to change a content of the variable object in the first template based on the change condition, and
when the second template includes the variable object, apply the common script including the conditional expression to the second template to change a content of the variable object in the second template based on the change condition.

9. The printer according to claim 1, wherein
in the first applying processing, the controller is configured not to
apply the common script to a first specific template when non-applying of the common script is designated in advance to the first specific template being the first template, and
apply the common script to a second specific template when the non-applying of the common scrip is defined by the second individual script to the second specific template being the second template corresponding to the second individual script.

10. The printer according to claim 9, wherein,
in the first applying processing, the controller is configured to
apply the common script to the second template other than the first specific template to execute relief setting processing for relieving an undefined object when the first individual script corresponding to the first specific template includes the undefined object by the non-applying of the common script.

11. The printer according to claim 1, wherein
a first set is defined in the first individual script, the first set including a first condition, a first setting content corresponding to the first condition, and a second setting content corresponding to other than the first condition,
a second set is defined in the second individual script, the second set including a second condition, a third setting content corresponding to the second condition, and a fourth setting content corresponding to other than the second condition
a third condition is set in the common script, at least one of the first setting content and the second setting content in the first individual script and at least one of the third setting content and the fourth setting content in the second individual script being defined in the third condition.

12. The printer according to claim 1, wherein
a change in a value of a variable defined by the first individual script is prohibited in the common script.

13. The printer according to claim 1, wherein, in the common script,
a definition relating to a predetermined character string is made, and
partial extraction use of the character string by the first individual script is prohibited.

14. A label printer comprising:
a printing unit configured to print image on a label;
a memory configured to store:
   a first template,
   a second template,
   a common script,
   a first individual script corresponding to the first template, and
   a second individual script corresponding to the second template; and
a controller, including at least one processor, configured to execute a label printing process, the label printing process including:
   applying the common script to the first individual script and the second individual script;
   after applying the common script to the first individual script, changing contents in the first template by applying the first individual script to the first template;
   after applying the common script to the second individual script, changing contents in the second template by applying the second individual script to the second template;
   printing a first image on a first label using the first template and printing a second image on a second label using the second template.

15. A label printing method for a label printer configured to print image on a label using a template,
the label printer comprising:
   a printing unit configured to print image on a label; and
   a processor configured to apply a script to a template or another script;
the label printing method comprising steps of:
   applying a common script to a first individual script and a second individual script;
   after applying the common script to the first individual script, changing contents in the first template by applying the first individual script to a first template;
   after applying the common script to the second individual script, changing contents in the second template by applying the second individual script to a second template;
   printing a first image on a first label using the first template and
   printing a second image on a second label using the second template.

* * * * *